R. Gipson,
Wringer,
N° 55,486. Patented June 12, 1866.

Witnesses
W. H. Burridge
A. W. McClelland

Inventor
Reuben Gipson

UNITED STATES PATENT OFFICE.

R. GIPSON, OF SHELBY, OHIO.

IMPROVED CLOTHES-WRINGER.

Specification forming part of Letters Patent No. 55,486, dated June 12, 1866.

*To all whom it may concern:*

Be it known that I, R. GIPSON, of Shelby, in the county of Richland and State of Ohio, have invented certain new and useful Improvements in Clothes-Wringers; and I do hereby declare that the following is a full and complete description of the construction and operation of the same, reference being had to the accompanying drawings, making a part of this specification, in which—

Figure 1:
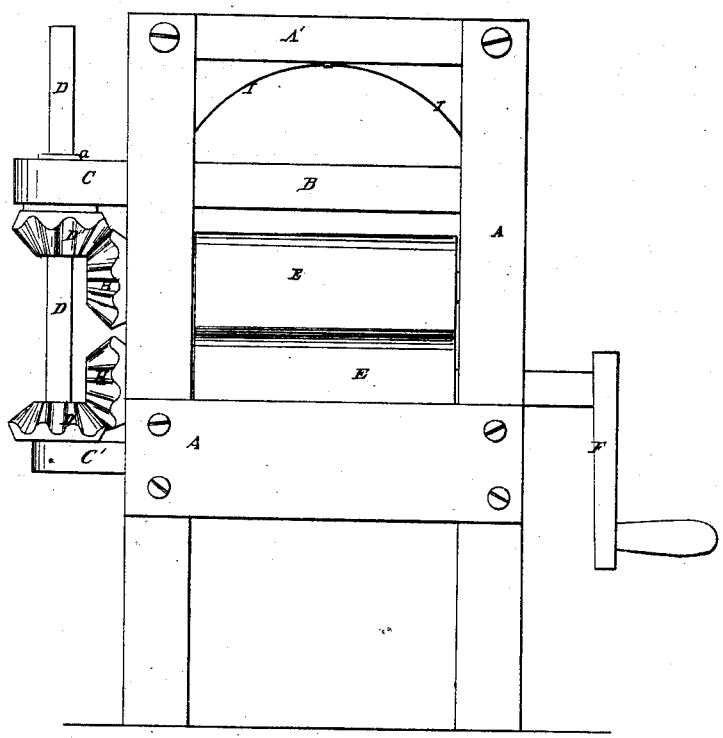
Figure 2:
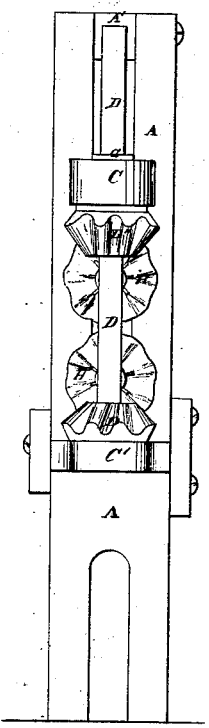

Figure 1 is a side view of the wringer. Fig. 2 is an end view.

Like letters of reference refer to like parts in the views.

A represents the frame of the form shown in the drawings. B is a bridge-tree, one end of which extends through a slot in the frame A, forming a lug, C, on the outside of the frame. C' is a lug at the lower part of the frame, in which the shaft D of the gear-wheels D' D" is stepped. E represents rollers, the shafts of which rest in boxes in the frame A. To one end of the shaft of the lower roller is connected the crank F, by which said roller is turned. On the other end of this shaft is a gear-wheel, H, that works in the gear wheel D'. To the shaft of the upper roller is connected a gear-wheel, H', in which the gear-wheel D" works. As the lower roller is turned by means of the crank F, the gear-wheel H attached to said roller turns the wheel D', which turns the shaft, said shaft being secured in the wheel D', and extends up, passing through a sleeve, $a$, in the lug C, indicated by the dotted lines in Fig. 1. This sleeve turns with the shaft in said lug. On the shaft, below this lug, is the gear-wheel D", which turns with the shaft, said shaft being square and passing through said wheel.

As the wheel D" turns it works in the wheel H', which is secured to the shaft of the upper roller, this roller being revolved or turned by means of the wheel D" working in the wheel H'. As the upper roller is raised by the quantity of clothes passing between the rollers, the gear-wheels H' and D" rise with said roller. Thus at whatever distance the roller may be raised it is turned by the wheel D" turning in the gear-wheel H', the wheel D" always turning with the shaft D. The gear-wheel D" slides up and down upon the shaft D, in gear with the wheel H', as the roller rises and falls in wringing the clothes.

I is a spring connected to the piece A' of the frame and the bridge-tree B.

What I claim as my improvement, and desire to secure by Letters Patent, is—

The arrangement of the shaft D, sleeve $a$, lugs C and C', in combination with the bridge-tree B, gearing D D' and H H', operating as and for the purpose set forth.

REUBEN GIPSON.

Witnesses:
W. H. BURRIDGE,
J. HOLMES.